(12) United States Patent
Puthalapat et al.

(10) Patent No.: US 8,887,057 B2
(45) Date of Patent: Nov. 11, 2014

(54) SEARCHING CHANNEL PATH DISPLAY OF A VIDEO NETWORK

(75) Inventors: Govinda Puthalapat, Tampa, FL (US); Jie Qian, Center Valley, PA (US); Tim Hunniecutt, Brandon, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2053 days.

(21) Appl. No.: 11/860,995

(22) Filed: Sep. 25, 2007

(65) Prior Publication Data
US 2009/0083818 A1 Mar. 26, 2009

(51) Int. Cl.
*G06F 15/00* (2006.01)
*G06F 13/00* (2006.01)

(52) U.S. Cl.
USPC .......................... 715/736; 715/734

(58) Field of Classification Search
USPC ......... 715/700, 711, 734–737, 741, 742–744, 715/761–762, 763–765, 780, 851–853
See application file for complete search history.

(56) References Cited

U.S. PATENT DOCUMENTS

| | | | | |
|---|---|---|---|---|
| 5,680,325 A | * | 10/1997 | Rohner | 709/220 |
| 7,477,285 B1 | * | 1/2009 | Johnson | 348/143 |
| 2005/0289623 A1 | * | 12/2005 | Midani et al. | 725/100 |

\* cited by examiner

*Primary Examiner* — Cao "Kevin" Nguyen

(57) ABSTRACT

A device may provide for display equipment associated with a channel path of a video network, receive selection of one of the equipment, provide for display the selected equipment, receive selection of a port of the selected equipment, and provide for display other equipment of the video network connected to the selected port.

24 Claims, 12 Drawing Sheets

SEARCHING CHANNEL PATH DISPLAY OF A VIDEO NETWORK

BACKGROUND

A video (e.g., television) network may provide national programming content and local and/or metropolitan-area content. The national programming content may include multiple national channels, and/or the local content may include multiple local channels. Such channels may be transmitted via a variety of equipment and/or channel paths maintained by a video network service provider before they are provided to customers (e.g., via a passive optical network (PON)). A PON is a point-to-multipoint, fiber to premises network architecture in which optical splitters are used to enable a single optical fiber to serve multiple premises (e.g., customers). Managing such a video network and its associated equipment, channels, etc. is a difficult task.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and/or methods that manage and/or display channel paths through equipment of a video network. For example, in one implementation, the systems and/or methods may receive a selected channel of the video network, and/or may determine equipment associated with the selected channel. The systems and/or methods may determine status information and/or port level details for the associated equipment, and/or may combine the information into a path for the selected channel. The systems and/or methods may display the information associated with the selected channel path. In other implementations, the systems and/or methods may enable a user to browse an inventory of the associated equipment, and/or may present a representation (e.g., an image) of any equipment selected by the user. If a user selects an input and/or an output port of the selected equipment, the systems and/or methods may present equipment connected to the selected port and/or may highlight the connection.

Figure 1:
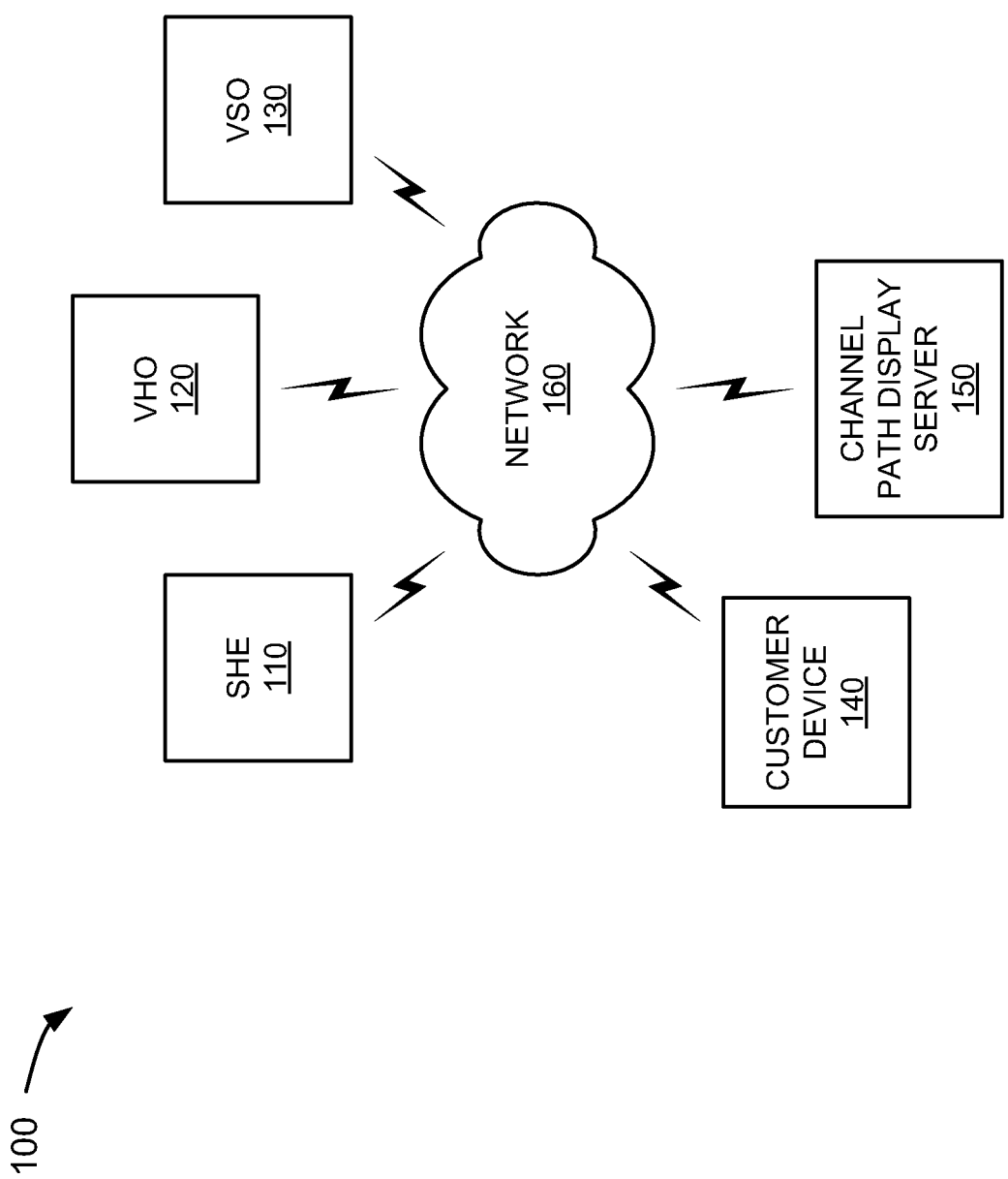
FIG. 1 is an exemplary diagram of a network in which systems and methods described herein may be implemented.

FIG. 1 is an exemplary diagram of a network 100 in which systems and methods described herein may be implemented. As illustrated, network 100 may include a super head end (SHE) 110, a video hub office (VHO) 120, a video service office (VSO) 130, a customer device 140, and/or a channel path display server 150 interconnected by a network 160. SHE 110, VHO 120, VSO 130, customer device 140, and/or channel path display server 150 may connect to network 160 via wired and/or wireless connections. A single SHE, VHO, VSO, customer device, channel path display server, and network have been illustrated in FIG. 1 for simplicity. In practice, there may be more or less SHEs, VHOs, VSOs, customer devices, channel path display servers, and/or networks. Also, in some instances, one or more of SHE 110, VHO 120, VSO 130, and/or channel path display server 150 may perform one or more functions described as being performed by another one or more of SHE 110, VHO 120, VSO 130, and/or channel path display server 150.

SHE 110 may include one or more server entities that gather, process, search, and/or provide information in a manner described herein. In one implementation, SHE 110 may include one or more devices that receive video (e.g., television signals) for processing and distribution over a video network (e.g., a cable television system). For example, SHE 110 may include equipment for receiving and/or re-transmitting video over a video network. In other implementations, SHE 110 may serve as a single point to aggregate national programming content. SHE 110 may encode the national programming content (e.g., into moving picture experts group (MPEG) streams), and/or may transmit the content over a network (e.g., network 160) to VHO 120.

VHO 120 may include one or more server entities that gather, process, search, and/or provide information in a manner described herein. In one implementation, VHO 120 may include one or more devices that collect local or metropolitan-area content, and/or combine the local content with national programming content received from SHE 110. In other implementations, VHO 120 may create an interactive program guide (IPG) for the national and local content that may be used by customers. In still other implementations, VHO 120 may convert video traffic (e.g., the national and local content) into video data signals (e.g., optical video data signals), and/or may transmit the video data signals over a network (e.g., network 160) to VSO 130.

VSO 130 may include one or more server entities that gather, process, search, and/or provide information in a manner described herein. In one implementation, VSO 130 may include one or more devices that receive the video data signals (e.g., the national and local content) from VHO 120, and/or receive data signals (e.g., high-speed Internet services), and/or voice signals (e.g., telephone services). In other implementations, VSO 130 may combine the video, data, and/or voice signals, and/or may transmit the combined signal (e.g., over a PON) to customers.

Customer device 140 may include any device capable of receiving video, data, and/or voice signals from VHO 130 (e.g., via network 160). For example, customer device 140 may include one or more of a private branch exchange (PBX), a set top box and a corresponding television monitor, a router and one or more corresponding computers, a telephone, etc. A PBX may include a private telephone network that may be used within an organization. A PBX may share a number of outside lines for making telephone calls external to the PBX. A set top box may include a device that may connect to a communication channel (e.g., a cable television line) and may produce output on a television monitor. A router may include a device that forwards information to one or more computers. A computer may include a computing device, such as a personal computer, a personal digital assistant (PDA), a laptop, or other types of computation or communication devices, threads or processes running on these devices, and/or objects executable by these devices. A telephone may include one or more types of telephone devices that are capable of providing telephony services (e.g., to the customer).

Channel path display server 150 may include one or more server entities that gather, process, search, and/or provide information in a manner described herein. In one implementation, channel path display server 150 may receive a selection of a channel of a video network (e.g., network 100), and/or may determine equipment associated with the selected channel. The associated equipment may be included within SHE 110, VHO 120, VSO 130, and/or network 160. Channel path display server 150 may determine status information and port level details for the associated equipment, and/or may combine the information into a path for the selected channel. Channel path display server 150 may display the information associated with the selected channel path. In other implementations, channel path display server 150 may enable a user (e.g., a network administrator) to scroll through the selected channel path and/or its associated equipment, and/or may enable the user to zoom on the associated equipment for display of connection details. In still other implementations, channel path display server 150 may include the features set forth in co-pending U.S. application Ser. No. 11/860,968, titled "CHANNEL PATH DISPLAY OF A VIDEO NETWORK," filed on Sep. 25, 2007, the disclosure of which is incorporated by reference herein in its entirety. Further details of channel path display server 150 are provided below in connection with FIGS. 3 and 4.

Network 160 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks that provide data, voice, and/or television services to the customer.

Although FIG. 1 shows exemplary components of network 100, in other implementations, network 100 may contain fewer, different, or additional components than depicted in FIG. 1. For example, network 100 may include one or more content servers that provide television programming, video content (e.g., movies, on-demand services, live television, etc.), etc. to customer device 140 (e.g., a set top box and a television monitor, one or more video encoders, etc.). In still other implementations, one or more components of network 100 may perform one or more other tasks described as being performed by one or more other components of network 100.

Figure 2:
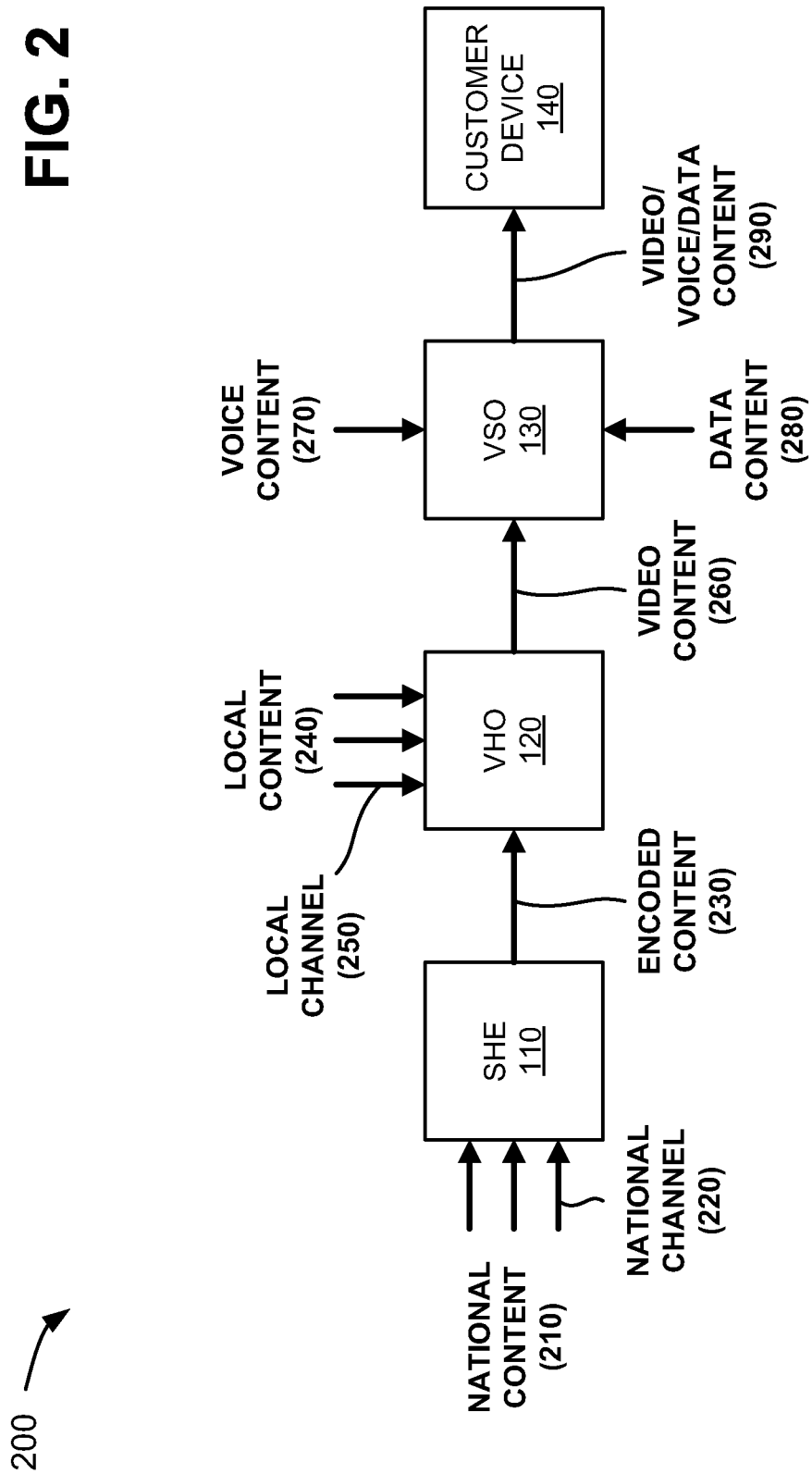
FIG. 2 illustrates exemplary operation of a portion of the network depicted in FIG. 1.

FIG. 2 depicts exemplary operation of a portion 200 of network 100. As illustrated, network portion 200 may include SHE 110, VHO 120, VSO 130, and/or customer device 140. SHE 110, VHO 120, VSO 130, and/or customer device 140 may include the features described above in connection with FIG. 1. SHE 110 may receive national programming content 210 that includes one or more national channels 220 (e.g., ABC, NBC, CBS, etc.). SHE 110 may encode national programming content 210 into encoded content 230 (e.g., MPEG streams), and/or may transmit encoded content 230 to VHO 120 (e.g., via network 160). VHO 120 may receive encoded content 230 and local content 240 that includes one or more local channels 250. VHO 120 may combine encoded content 230 and local content 240, may convert the combined content into video content 260 (e.g., optical video data signals), and/or may transmit video content 260 to VSO 130 (e.g., via network 160).

As further shown in FIG. 2, VSO 130 may receive video content 260, voice content 270 (e.g., telephony services), and data content 280 (e.g., Internet traffic). VSO 130 may combine video content 260, voice content 270, and data content 280 into video/voice/data content 290, and may transmit video/voice/data content 290 to customer device 140. In one implementation, VSO 130 may transmit video/voice/data content 290 as an optical signal, via a PON, to customer device 140. In one implementation, customer device 140 may receive video/voice/data content 290, and may convert a video portion of content 290 into an electrical signal (e.g., which may be used by cable-ready televisions and/or set top boxes via coaxial cables).

Although FIG. 2 shows exemplary components of network portion 200, in other implementations, network portion 200 may contain fewer, different, or additional components than depicted in FIG. 2. In still other implementations, one or more components of network portion 200 may perform one or more other tasks described as being performed by one or more other components of network portion 200.

Figure 3:
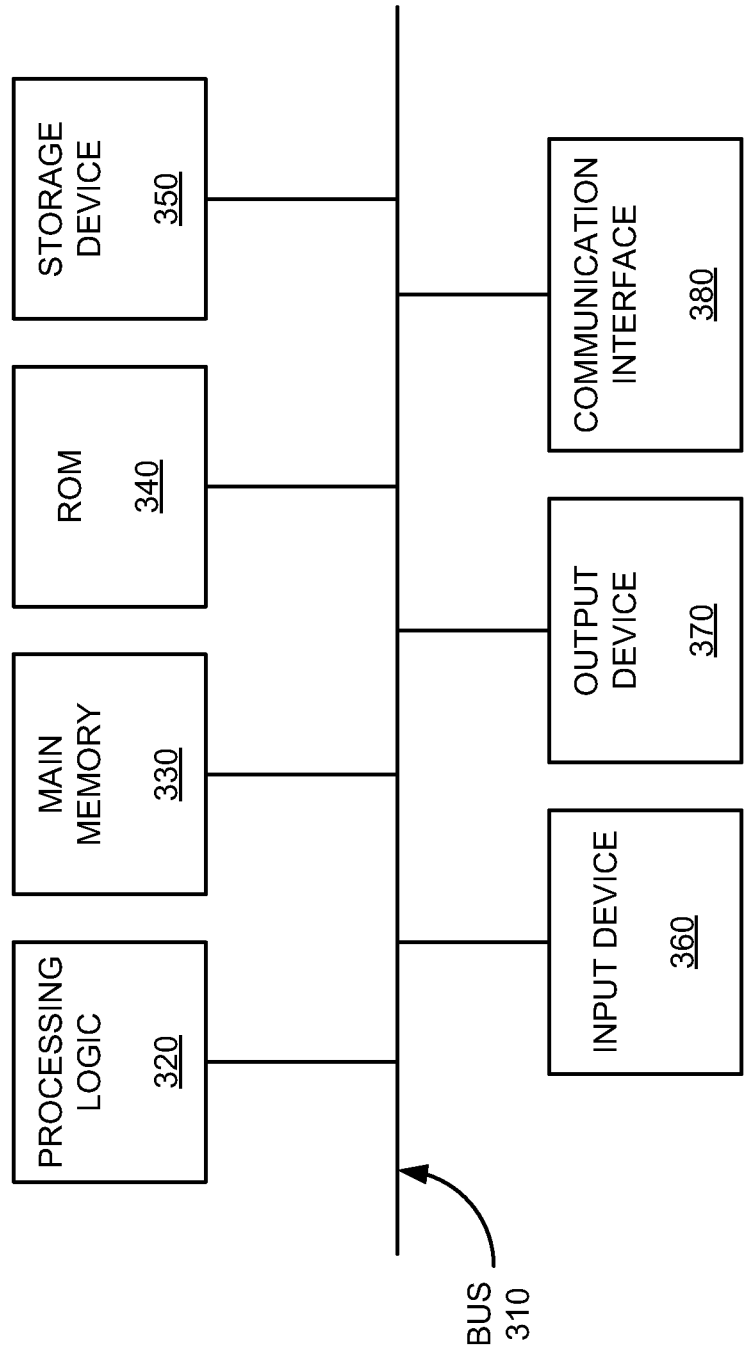
FIG. 3 illustrates exemplary components of a channel path display server of the network depicted in FIG. 1.

FIG. 3 is an exemplary diagram of channel path display server 150. As illustrated, channel path display server 150 may include a bus 310, processing logic 320, a main memory 330, a read-only memory (ROM) 340, a storage device 350, an input device 360, an output device 370, and/or a communication interface 380. Bus 310 may include a path that permits communication among the components of channel path display server 150.

Processing logic 320 may include a processor, microprocessor, or other type of processing logic that may interpret and execute instructions. Main memory 330 may include a random access memory (RAM) or another type of dynamic storage device that may store information and instructions for execution by processing logic 320. ROM 340 may include a ROM device or another type of static storage device that may store static information and/or instructions for use by processing logic 320. Storage device 350 may include a magnetic and/or optical recording medium and its corresponding drive.

Input device 360 may include a mechanism that permits an operator to input information to channel path display server 150, such as a keyboard, a mouse, a pen, a microphone, voice recognition and/or biometric mechanisms, etc. Output device 370 may include a mechanism that outputs information to the operator, including a display, a printer, a speaker, etc. Communication interface 380 may include any transceiver-like mechanism that enables channel path display server 150 to communicate with other devices and/or systems. For example, communication interface 380 may include mechanisms for communicating with another device or system via a network, such as network 160.

As described herein, channel path display server 150 may perform certain operations in response to processing logic 320 executing software instructions contained in a computer-readable medium, such as main memory 330. A computer-readable medium may be defined as a physical or logical memory device and/or carrier wave. The software instructions may be read into main memory 330 from another computer-readable medium, such as storage device 350, or from another device via communication interface 380. The software instructions contained in main memory 330 may cause processing logic 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of channel path display server 150, in other implementations, channel path display server 150 may contain fewer, different, or additional components than depicted in FIG. 3. In still other implementations, one or more components of channel path display server 150 may perform one or more other tasks described as being performed by one or more other components of channel path display server 150.

Figure 4:
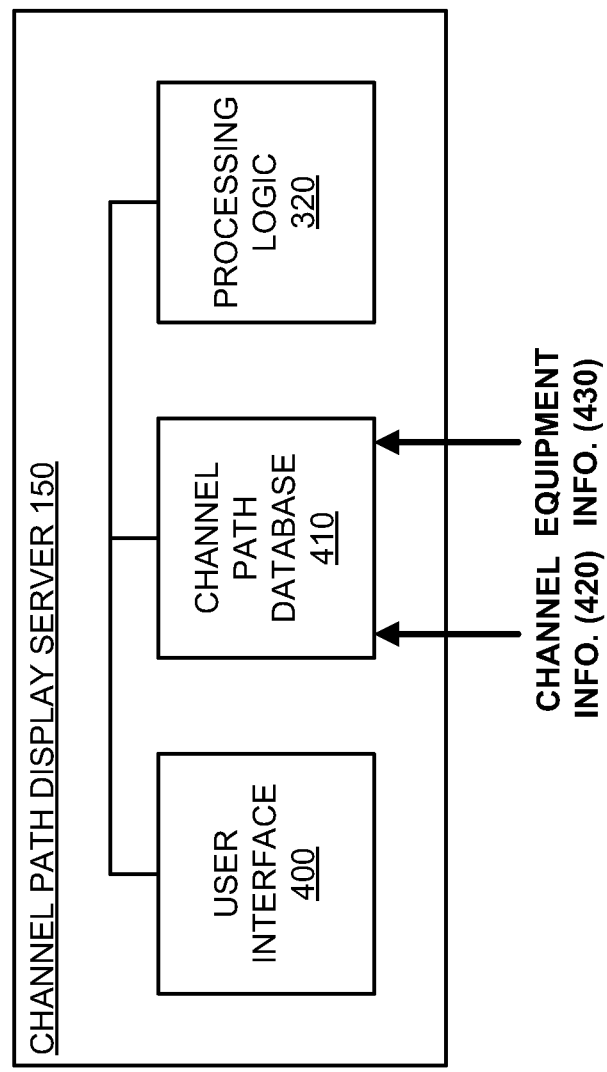
FIG. 4 depicts other exemplary components of the channel path display server of the network illustrated in FIG. 1.

FIG. 4 depicts other exemplary components of channel path display server 150. As illustrated, channel path display server 150 may include a user interface 400 and a channel path database 410 in addition to processing logic 320. In one implementation, processing logic 320 may cooperate with channel path database 410 to display channel path information via user interface 400.

User interface 400 may include a graphical user interface (GUI) or a non-graphical user interface, such as a text-based interface. User interface 400 may provide information to users (e.g., network administrators) via a customized interface (e.g., a proprietary interface) and/or other types of interfaces (e.g., a browser-based interface). User interface 400 may receive user inputs via one or more input devices (e.g., input device 360), may be user configurable (e.g., a user may change the size of user interface 400, information displayed in user interface 400, color schemes used by user interface 400, positions of text, images, icons, windows, etc., in user interface 400, etc.), and/or may not be user configurable. User interface 400 may be displayed to a user via one or more output devices (e.g., output device 370).

Database 410 may be provided in channel path display server 150 (e.g., within storage device 350) and/or may be managed by channel path display server 150 (e.g., in which case, database may be located external to channel path display server 150). Database 410 may include a variety of information related to equipment, channels, etc. provided by SHE 110, VHO 120, VSO 130, customer device 140, and/or network 160. As shown in FIG. 4, database 410 may receive channel information 420 and/or equipment information 430 from SHE 110, VHO 120, VSO 130, customer device 140, and/or network 160. Channel information 420 may include any information related to any channel provided by network 100. Equipment information 430 may include any information related to any equipment associated with channel information 420. For example, equipment information 430 may include information related to equipment in network 100 that may be used to create a path(s) for one or more channels.

In one implementation, user interface 400 may receive selection (e.g., from a network administrator) of a channel provided by network 100, and processing logic 320 may query database 410 to determine equipment in network 100 that may be associated with the selected channel (e.g., used to create a path for the selected channel). Processing logic 320 may query database 410 to determine status information (e.g., operational, offline, problem, etc.) and/or port level details (e.g., which input and/or output ports are used for the selected channel path) of the associated equipment. Processing logic 320 may combine such information (e.g., associated equipment, status information, port level details, etc.) into a path for the selected channel, and/or may provide the combined information to user interface 400 for display.

In another implementation, processing logic 320 may query database 410 to determine status information of equipment and/or channels in network 100. User interface 400 may receive selection (e.g., from a user) of equipment provided by network 100, and/or may display the selected equipment (e.g., a representation of the selected equipment). If user interface 400 receives selection of an input port and/or an output port of the selected equipment, processing logic 320 may locate equipment connected to the selected port (e.g., from database 410), and/or user interface 400 may display the connected equipment. Such an arrangement may enable a user to virtually scroll through connected equipment in network 100 (e.g., by selecting ports of equipment in network 100), and may enable viewing the equipment of network 100 with port level details.

Although FIG. 4 shows exemplary components of channel path display server 150, in other implementations, channel path display server 150 may contain fewer, different, or additional components than depicted in FIG. 4. In still other implementations, one or more components of channel path display server 150 may perform one or more other tasks described as being performed by one or more other components of channel path display server 150.

Figure 5:
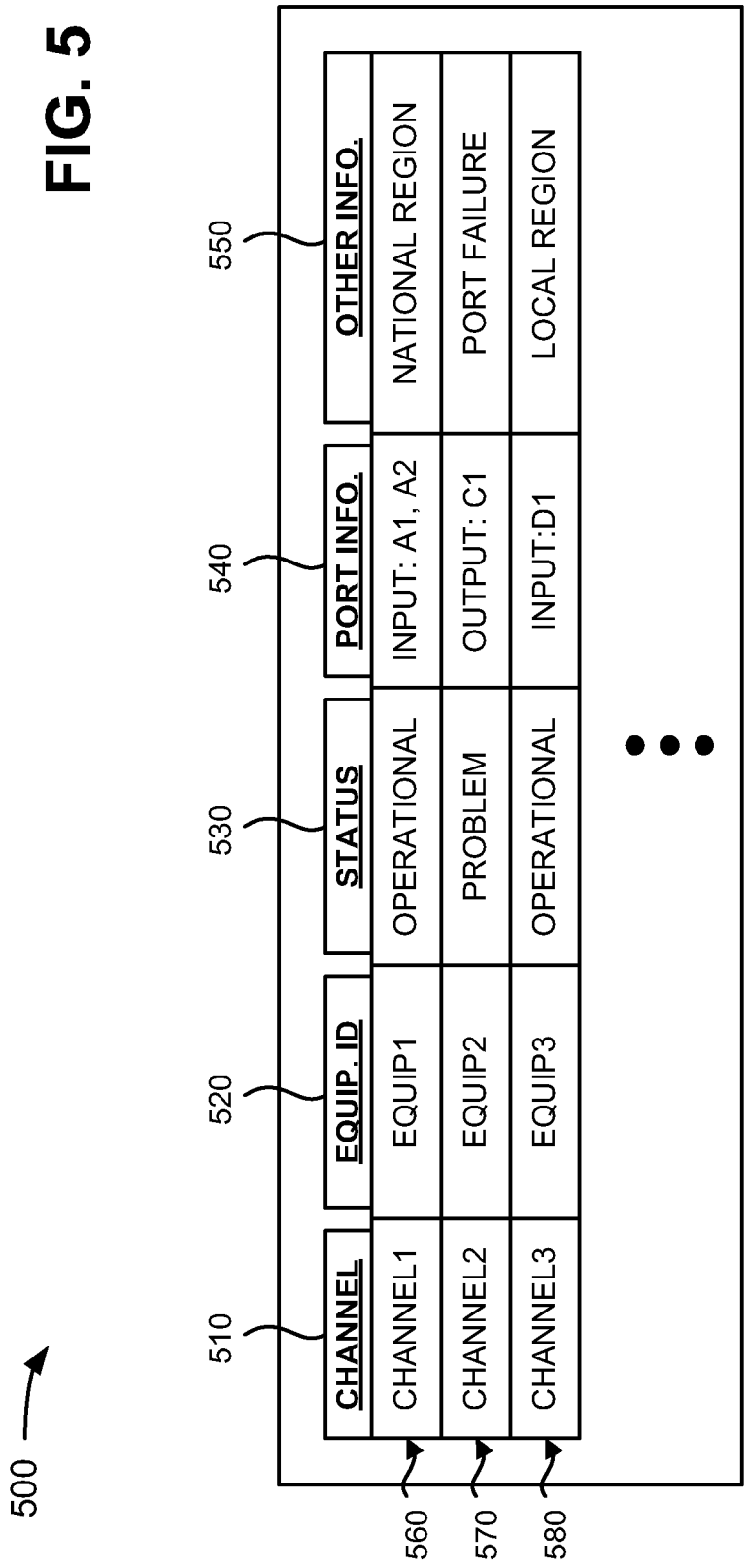
FIG. 5 illustrates a portion of a database that may be associated with the channel path display server depicted in FIG. 4.

FIG. 5 illustrates a portion 500 of database 410 capable of being provided in channel path display server 150 (e.g., within storage device 350) and/or managed by channel path display server 150. The information provided in database portion 500 may be provided by any device in network 100 (e.g., by SHE 110, VHO 120, VSO 130, customer device 140, and/or devices provided in network 160). For example, as described above in connection with FIG. 4, database 410 may receive channel information 420 and/or equipment information 430 from SHE 110, VHO 120, VSO 130, customer device 140, and/or network 160.

As illustrated, database portion 500 may include a variety of channel path information, such as a channel category 510, an equipment identification (ID) category 520, an equipment status category 530, a port information category 540, and an other information category 550. Each category of database portion 500 may include multiple channel path information-associated records. For example, as shown in FIG. 5, database portion 500 may include a first record 560, a second record 570, and third record 580. Although database portion 500 depicts three records, in other implementations, database portion 500 may include fewer, more, or different records than depicted in FIG. 5. Furthermore, database portion 500 may include fewer, different, or additional categories than depicted in FIG. 5.

Channel category 510 may include the names of channels provided by network 100. For example, first record 560 may include the name "CHANNEL1" (e.g., "NBC") under channel category 510, second record 570 may include the name "CHANNEL2" under channel category 510, and third record 580 may include the name "CHANNEL3" under channel category 510. Equipment ID category 520 may include identification of one or more pieces of equipment (e.g., in network 100) associated with the channel provided in channel category 510. For example, first record 560 may include the equipment identification "EQUIP1" under equipment ID category 520.

Equipment status category 530 may include the status of equipment associated with each equipment ID provided in equipment ID category 520. For example, first record 560 may include the equipment status "OPERATIONAL" under equipment status category 530, second record 570 may include the equipment status "PROBLEM" under equipment status category 530, and third record 580 may include the equipment status "OPERATIONAL" under equipment status category 530. Port information category 540 may include any port information (e.g., input ports and output ports for each piece of equipment along the path with the originating equipment having output ports and the destination equipment having input ports) associated with each equipment ID provided in equipment ID category 520. For example, first record 560 may include port information "INPUT: A1, A2" under port information category 540.

Other information category 550 may include other information associated with the information provided in channel category 510, equipment ID category 520, equipment status category 530, and/or port information category 540. For example, first record 560 may include other information "NATIONAL REGION" (e.g., indicating that CHANNEL1 is from a national region) under other information category 550, second record 570 may include other information "PORT FAILURE" (e.g., indicating a port failure in EQUIP2) under other information category 550, and third record 580 may include other information "LOCAL REGION" (e.g., indicating that CHANNEL3 is from a local region) under other information category 550.

Although FIG. 5 shows exemplary information that may be provided in database portion 500, in other implementations, database portion 500 may contain fewer, different, or additional information than depicted in FIG. 5.

Figure 6:
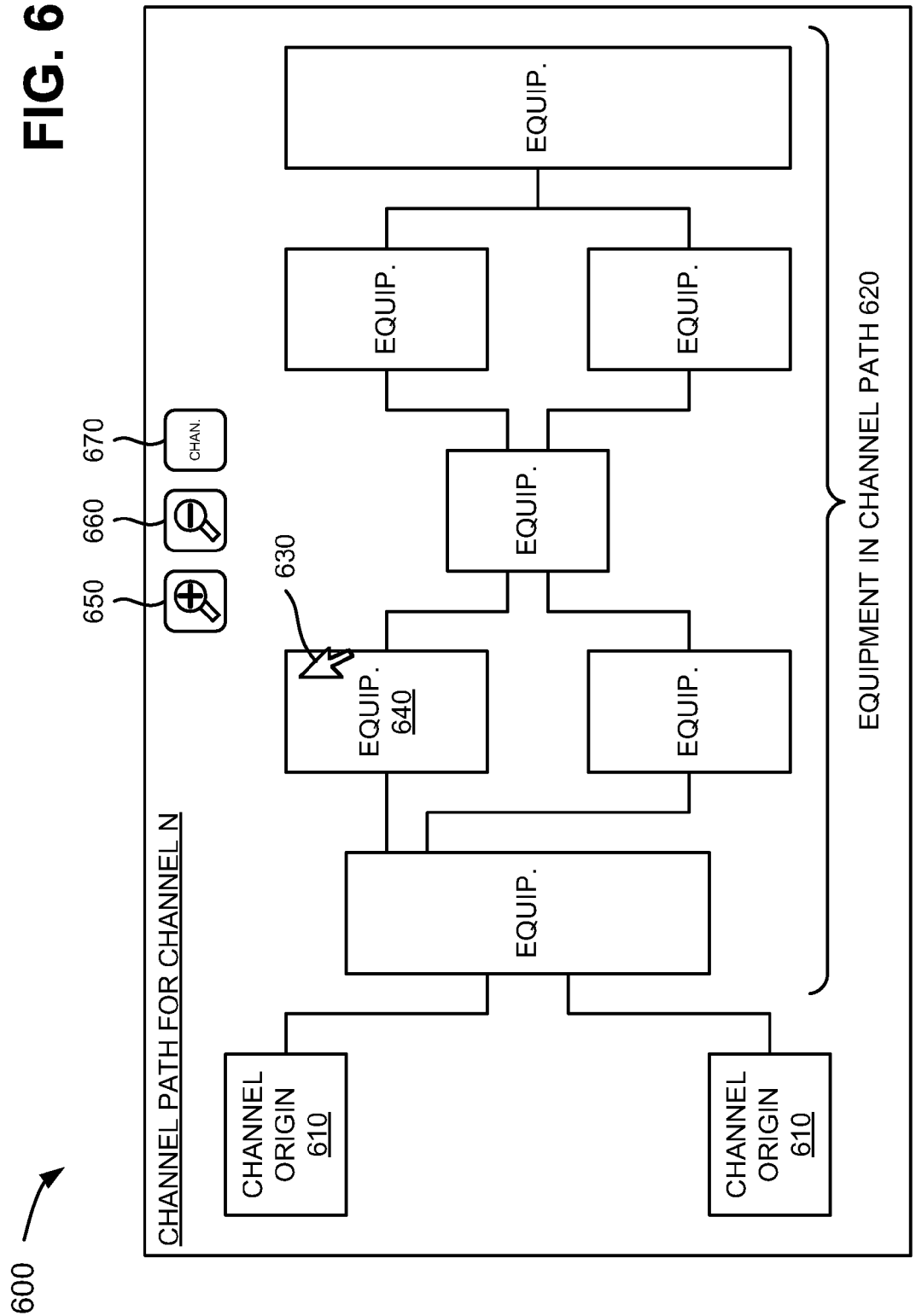
FIGS. 6-9 illustrate exemplary user interfaces associated with the channel path display server depicted in FIG. 1.

FIGS. 6-9 depict exemplary user interfaces 600-900 that may be provided by channel path display server 150 (e.g., via user interface 400). If a user selects a channel path (e.g., via input of the channel to channel path display server 150), user interface 600, as shown in FIG. 6, may be displayed to the user. As illustrated, user interface 600 may include a variety of information associated with the channel path selected by the user, and/or may provide a view of the entire path associated with the selected channel. This may enable a user to view the entire channel path of a selected channel and its associated equipment. In one implementation, user interface 600 may include one or more channel origins 610, equipment 620 in the selected channel path (e.g., that may include a selected equipment 640), a selector mechanism 630, a zoom in button 650, a zoom out button 660, and/or a channel selector button 670.

Channel origins 610 may include one or more devices (e.g., a satellite, etc.) that generate the selected channel. Equipment 620 and/or selected equipment 640 may include any devices (e.g., representative images of devices) provided by network 100 that may communicate the selected channel through network 100. For example, each of equipment 620 and selected equipment 640 may include a gateway, a router, a switch, a firewall, a bridge, a multiplexer, a splitter, and/or some other type of device that transmits and/or receives the selected channel as part of conveying the selected channel to customer device 140.

Selector mechanism 630 may include a mechanism that enables a user to select one or more components (e.g., one of equipment 620 in the channel path, such as equipment 640) displayed by user interface 600. If selected by a user (e.g., via selector mechanism 630), zoom in button 650 may enable the user to zoom in on the channel path (or a portion of the channel path) displayed by user interface 600. If selected by a user (e.g., via selector mechanism 630), zoom out button 660 may enable the user to zoom out from the channel path (or a portion of the channel path) displayed by user interface 600. If selected by a user (e.g., via selector mechanism 630), channel selector button 670 may enable the user to select another channel for display by user interface 600.

As further shown in FIG. 6, if a user wishes to view particular equipment provided by user interface 600, the user may select the equipment (e.g., selected equipment 640) with selector mechanism 630, and channel path display server 150 may provide a user interface displaying the selected equipment. User interface 700 of FIG. 7 depicts an exemplary user interface that may be provided if the user selects equipment 640 with selector mechanism 630.

As illustrated, user interface 700 may include a variety of information associated with selected equipment 640. In one implementation, user interface 700 may display status information, identification information, port level details, etc. of selected equipment 640. In other implementations, user interface 700 may display input ports (e.g., "IN1, . . . , IN8") and/or output ports (e.g., "OUT1, . . . , OUT4") associated with selected equipment 640. Ports of selected equipment 640 that provide the selected channel may be highlighted, and/or ports that do not provide the selected channel may not be highlighted. For example, the selected channel provided by user interface 700 may enter selected equipment 640 via input ports 710 (e.g., "IN1, IN2, IN3, IN4, IN5, and IN7"), and may exit selected equipment 640 via output ports 720 (e.g., "OUT1, . . . , OUT4"). The ports providing the selected channel (e.g., input ports 710 and output ports 720) may provide an indication (e.g., via color coding or some other similar mechanism) of how a signal(s) is flowing through selected equipment 640 (e.g., strength of the signal, etc.).

Figure 7:
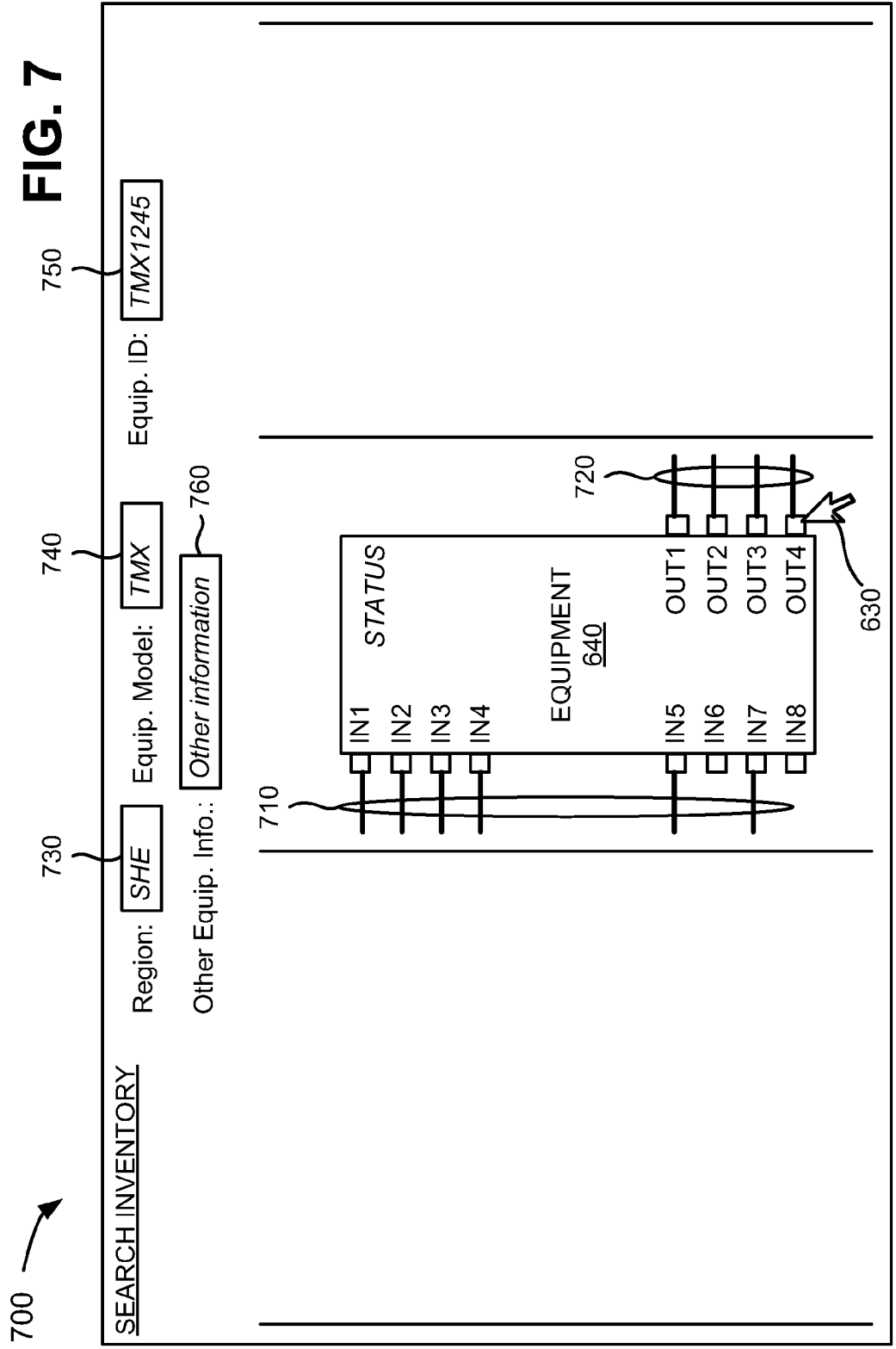

As further shown in FIG. 7, user interface 700 may provide additional information associated with selected equipment 640. For example, user interface 700 may provide region information 730, equipment model information 740, equipment identification information 750, and/or other equipment information 760 associated with selected equipment 640. Region information 730 may include information about a region (e.g., within SHE 110) of network 100 where selected equipment 640 may be located. Equipment model information 740 may include information identifying a model (e.g., "TMX") of selected equipment 640. Equipment identification information 750 may include information identifying selected equipment 640 (e.g., a serial number, a network address, etc.). Other equipment information 760 may include any other information associated selected equipment 640 (e.g., status information, etc.).

If a user selects any of input ports 710 or output ports 720, channel path display server 150 may display equipment connected to the selected port. For example, a user may select (e.g., with selector mechanism 630) one of output ports 720 (e.g., "OUT4"), and channel path display server 150 may display user interface 800 shown in FIG. 8. As illustrated, user interface 800 may display equipment 810 connected to the selected one of output ports 720. In one implementation, user interface 800 may display status information, identification information, port level details, etc. of equipment 810. In other implementations, user interface 800 may display input ports (e.g., "IN1, . . . , IN8") and/or output ports (e.g., "OUT1, . . . , OUT4") associated with equipment 810. Ports of equipment 810 that connect to selected equipment 640 may be highlighted (e.g., in a color). For example, the selected channel provided by user interface 800 may enter equipment 810 via input ports 820 (e.g., "IN1, . . . , IN4"), and may exit equipment 810 via output ports 830 (e.g., "OUT1, . . . , OUT4"). The ports providing the selected channel (e.g., input ports 820 and output ports 830) may provide an indication (e.g., via color coding or some other similar mechanism) of how a signal(s) is flowing through equipment 810 (e.g., strength of the signal, etc.).

Figure 8:
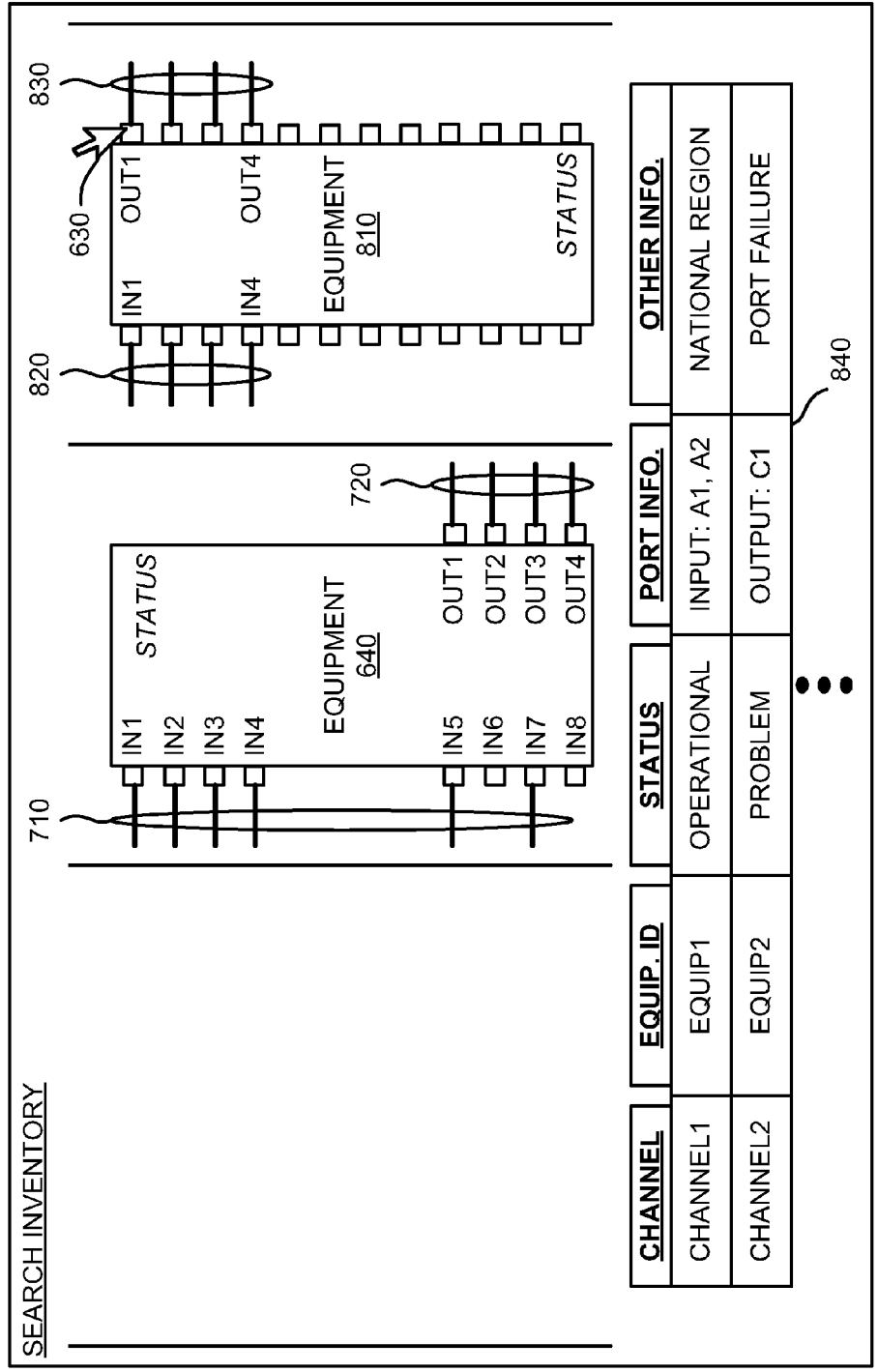

As further shown in FIG. 8, user interface 800 may display information 840 associated with channel(s) transmitted between selected equipment 640 and equipment 810. Information 840 may include a variety information related to channel(s) transmitted between selected equipment 640 and equipment 810. For example, in one implementation, information 840 may include a channel field (e.g., identifying channels associated with selected equipment 640 and equipment 810), an equipment identification field (e.g., providing equipment identification information), a status field (e.g., providing equipment status information), a port information field (e.g., providing port level details of equipment), and/or an other information field (e.g., providing region information, port information, etc.). In another implementation, information 840 may be retrieved from database 410 by processing logic 320 and provided by user interface 400. In other implementations, information 840 may include fewer, additional, and/or different information than depicted in FIG. 8.

If a user selects any of input ports 820 or output ports 830, channel path display server 150 may display equipment connected to the selected port. For example, a user may select (e.g., with selector mechanism 630) one of output ports 830 (e.g., "OUT1"), and channel path display server 150 may display user interface 900 shown in FIG. 9. As illustrated, user interface 900 may display equipment 910 connected to the selected one of output ports 830. In one implementation, user interface 900 may display status information, identification information, port level details, etc. of equipment 910. In other implementations, user interface 900 may display input ports (e.g., "IN1, . . . , IN8") and/or output ports (e.g., "OUT1, . . . , OUT4") associated with equipment 910. Ports of equipment 910 that connect to equipment 810 may be highlighted (e.g., in a color). For example, the selected channel provided by user interface 900 may enter equipment 910 via input ports 920 (e.g., "IN1, . . . , IN4"), and may exit equipment 910 via an output port 930 (e.g., "OUT1"). The ports providing the selected channel (e.g., input ports 920 and output port 930) may provide an indication (e.g., via color coding or some other similar mechanism) of how a signal(s) is flowing through equipment 910 (e.g., strength of the signal, etc.).

Figure 9:
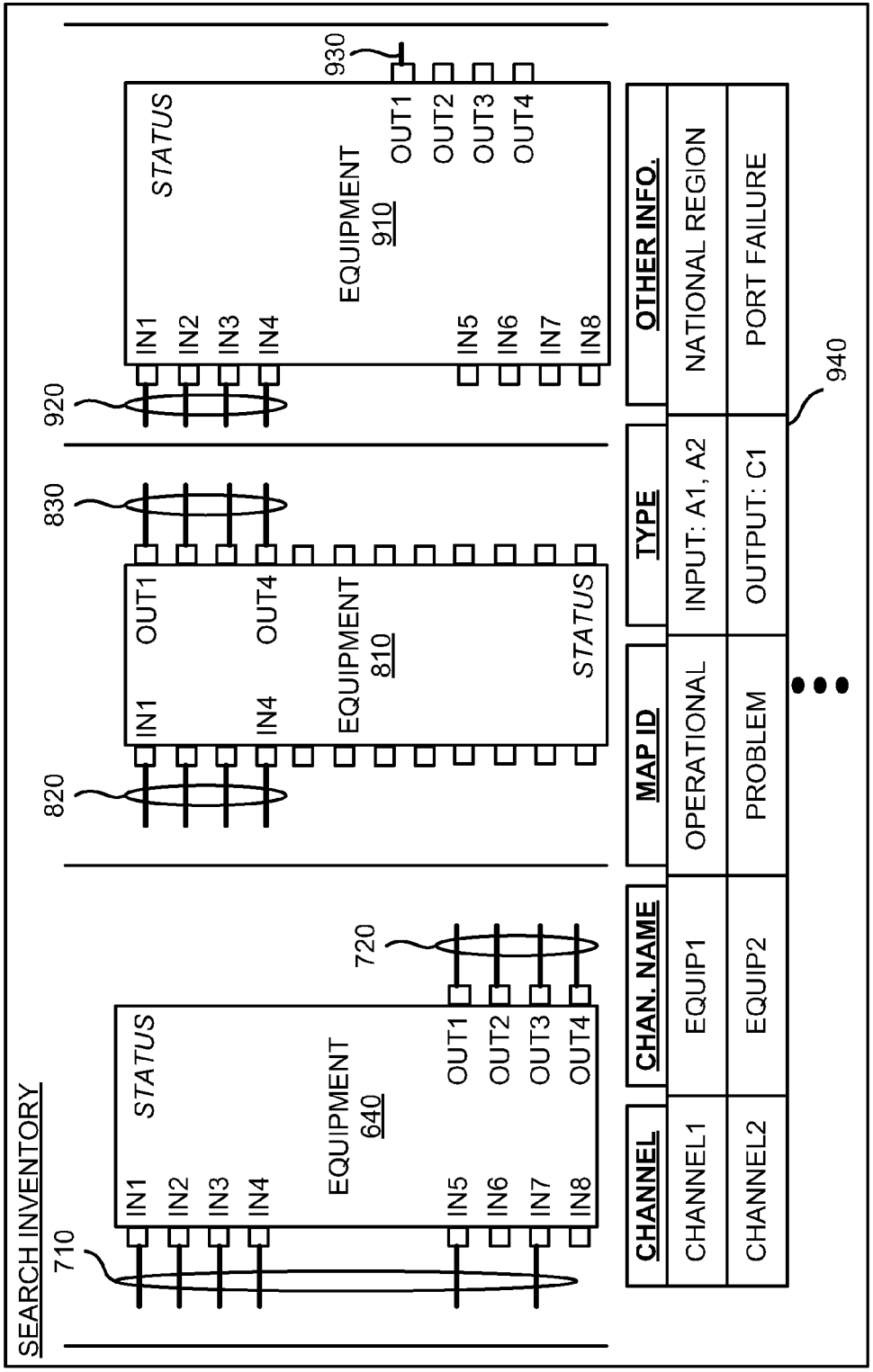

As further shown in FIG. 9, user interface 900 may display information 940 associated with channel(s) transmitted between equipment 810 and equipment 910. Information 940 may include a variety information related to channel(s) transmitted between equipment 810 and equipment 910. For example, in one implementation, information 940 may include a channel field (e.g., identifying channels associated with equipment 810 and equipment 910), an equipment identification field (e.g., providing equipment identification information), a status field (e.g., providing equipment status information), a port information field (e.g., providing port level details of equipment), and/or an other information field (e.g., providing region information, port information, etc.). In another implementation, information 940 may be retrieved from database 410 by processing logic 320 and provided by user interface 400. In other implementations, information 940 may include fewer, additional, and/or different information than depicted in FIG. 9.

Although FIGS. 6-9 show exemplary components of user interfaces 600-900, in other implementations, user interfaces 600-900 may contain fewer, different, or additional components than depicted in FIGS. 6-9. In still other implementations, one or more components of user interfaces 600-900 may perform one or more other tasks described as being performed by one or more other components of user interfaces 600-900.

Figure 10:
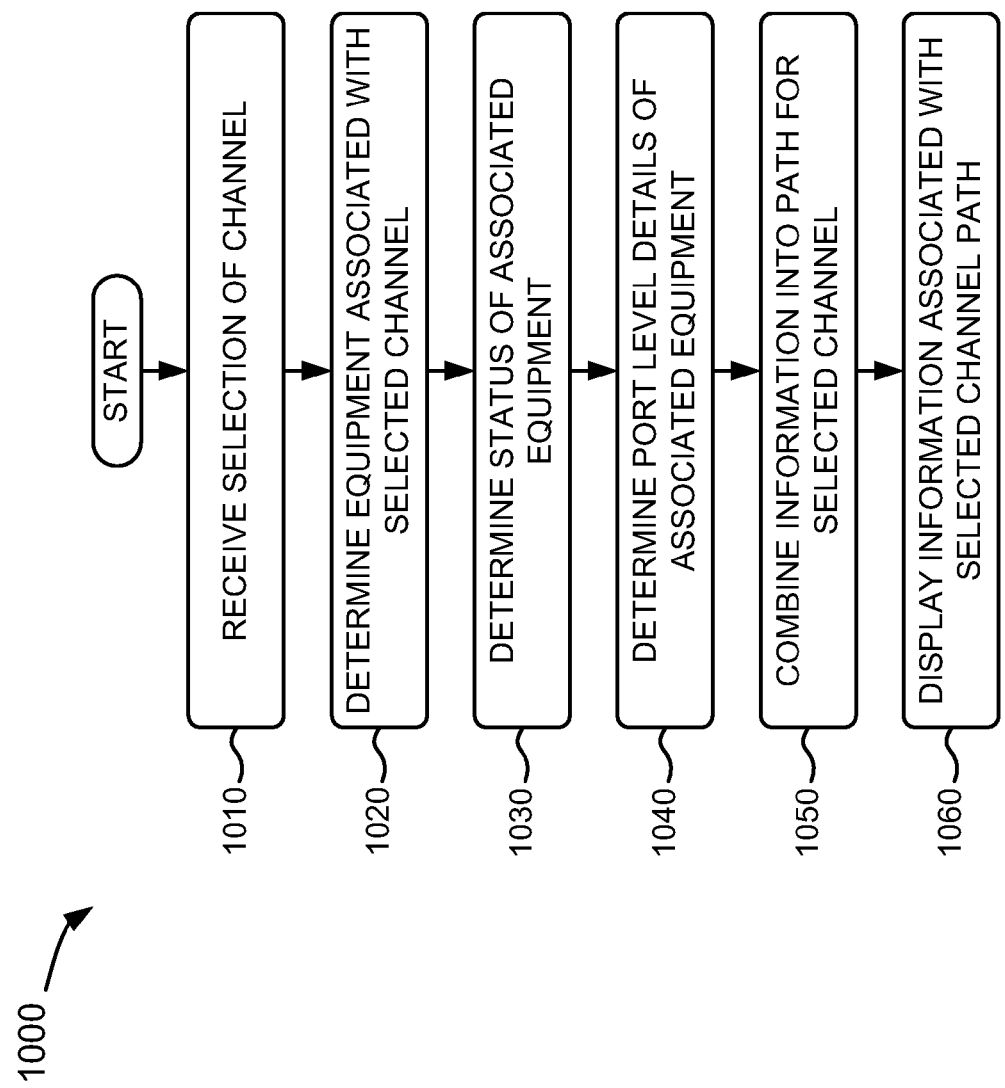
FIGS. 10-12 depict flow charts of exemplary processes according to implementations described herein.

FIG. 10 depicts a flow chart of an exemplary process 1000 for displaying information associated with a selected channel path according to implementations described herein. In one implementation, process 1000 may be performed by channel path display server 150. In another implementation, some or all of process 1000 may be performed by another device or group of devices, including or excluding channel path display server 150. Process 1000 may begin with a user accessing channel path display server 150. A selection of a channel of a video network may be received (block 1010), and/or equipment associated with the selected channel may be determined (block 1020). For example, in one implementation described above in connection with FIG. 4, user interface 400 of channel path display server 150 may receive selection (e.g., from a user) of a channel provided by network 100, and processing logic 320 may query database 410 to determine equipment in network 100 that may be associated with the selected channel (e.g., used to create a path for the selected channel).

As further shown in FIG. 10, status information of the equipment associated with the selected channel may be determined (block 1030), and/or port level details of the associated equipment may be determined (block 1040). For example, in one implementation described above in connection with FIG. 4, processing logic 320 may query database 410 to determine status information (e.g., operational, offline, problem, etc.) and/or port level details (e.g., which input and/or output ports are used for the selected channel path) of the associated equipment.

Returning to FIG. 10, the associated equipment information, the status information, and the port level details may be combined into a path for the selected channel (block 1050), and/or information associated with the selected channel path may be displayed (block 1060). For example, in one implementation described above in connection with FIG. 4, processing logic 320 may combine such information (e.g., associated equipment, status information, port level details, etc.) into a path for the selected channel, and/or may provide the combined information to user interface 400 for display.

Figure 11:
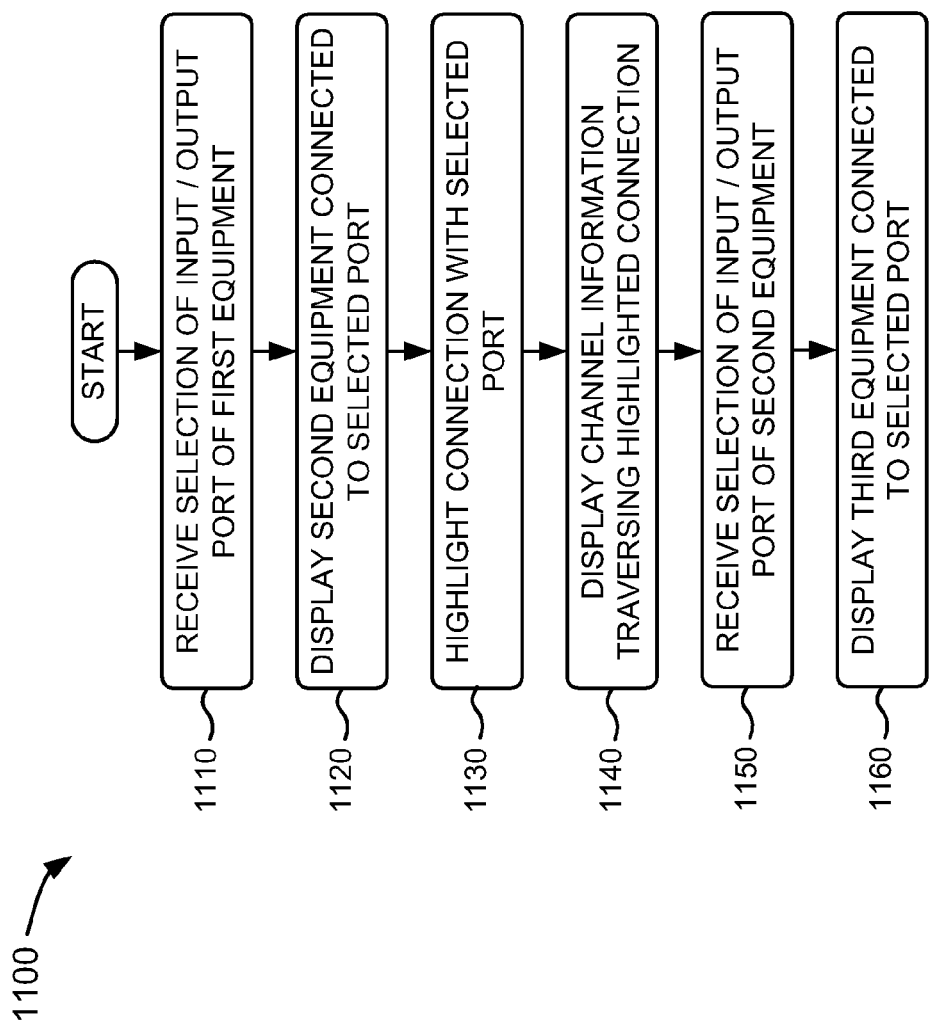

FIG. 11 depicts a flow chart of an exemplary process 1100 for tracking information associated with a selected channel path according to implementations described herein. In one implementation, process 1100 may be performed by channel path display server 150. In another implementation, some or all of process 1100 may be performed by another device or group of devices, including or excluding channel path display server 150. As illustrated, process 1100 may begin with receipt of a selection of an input port and/or an output port of first equipment of a video network (block 1110), and/or display of second equipment connected to the selected port (block 1120). For example, in one implementation described above in connection with FIGS. 7 and 8, if a user selects any of input ports 710 or output ports 720 of selected equipment 640, channel path display server 150 may display equipment connected to the selected port. For example, a user may select (e.g., with selector mechanism 630) one of output ports 720 (e.g., "OUT4"), and channel path display server 150 may display, via user interface 800, equipment 810 connected to the selected one of output ports 720.

As further shown in FIG. 11, a connection with the selected port may be highlighted (block 1130), and/or information associated with a channel traversing the highlighted connection may be displayed (block 1140). For example, in one implementation described above in connection with FIG. 8, user interface 800 may display input ports (e.g., "IN1, . . . , IN8") and/or output ports (e.g., "OUT1, . . . , OUT4") associated with equipment 810. Ports of equipment 810 that connect to selected equipment 640 may be highlighted (e.g., in a color). User interface 800 may display information 840 associated with channel(s) transmitted between selected equipment 640 and equipment 810. Information 840 may include a channel field, an equipment identification field, a status field, a port information field, and/or an other information field.

Returning to FIG. 11, selection of an input port and/or an output port of the second equipment may be received (block 1150), and/or third equipment connected to the selected port of the second equipment may be displayed (block 1160). For example, in one implementation described above in connection with FIGS. 8 and 9, if a user selects any of input ports 820 or output ports 830 of equipment 810, channel path display server 150 may display equipment connected to the selected port. For example, a user may select (e.g., with selector mechanism 630) one of output ports 830 (e.g., "OUT1"), and channel path display server 150 may display, via user interface 900, equipment 910 connected to the selected one of output ports 830.

Figure 12:
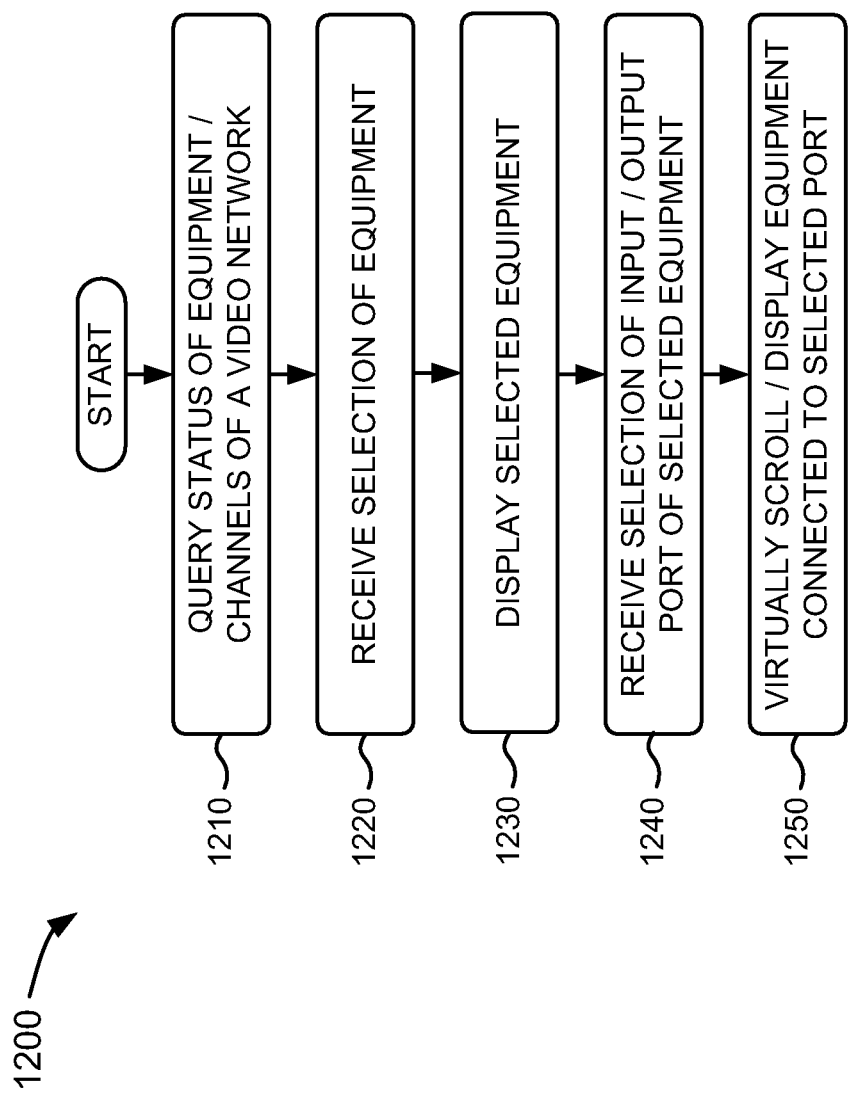

FIG. 12 depicts a flow chart of another exemplary process 1200 for tracking information associated with a selected channel path according to implementations described herein. In one implementation, process 1200 may be performed by channel path display server 150. In another implementation, some or all of process 1100 may be performed by another device or group of devices, including or excluding channel path display server 150. As illustrated, process 1200 may begin with querying status of equipment and/or channels of a video network (block 1210), receiving selection of equipment in the video network (block 1220), and/or displaying the selected equipment (block 1230). For example, in one implementation described above in connection with FIG. 4, processing logic 320 may query database 410 to determine status information of equipment and/or channels in network 100. User interface 400 may receive selection (e.g., from a user) of equipment provided by network 100, and/or may display the selected equipment (e.g., a representation of the selected equipment).

Returning to FIG. 12, selection of an input port and/or an output port of the selected equipment may be received (block 1240), and/or equipment connected to the selected port may be virtually scrolled and/or displayed (block 1250). For example, in one implementation described above in connection with FIG. 4, if user interface 400 receives selection of an input port and/or an output port of the selected equipment, processing logic 320 may locate equipment connected to the selected port (e.g., from database 410) and/or user interface 400 may display the connected equipment. Such an arrangement may enable a user to virtually scroll connected equipment in network 100 (e.g., by selecting ports of equipment in network 100), and may enable viewing the equipment of network 100 with port level details.

Implementations described herein may include systems and/or methods that manage and/or display channel paths through equipment of a video network. For example, in one implementation, the systems and/or methods may receive a selected channel of the video network, and/or may determine equipment associated with the selected channel. The systems and/or methods may determine status information and/or port level details for the associated equipment, and/or may combine the information into a path for the selected channel. The systems and/or methods may display the information associated with the selected channel path. In other implementations, the systems and/or methods may enable a user to browse an inventory of the associated equipment, and/or may present a representation of any equipment selected by the user. If a user selects an input and/or an output port of the selected equipment, the systems and/or methods may present equipment connected to the selected port and/or may highlight the connection.

The foregoing description of implementations provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 10-12, the order of the acts may be modified in other implementations. Further, non-dependent acts may be performed in parallel.

Also, the term "user" has been used herein, and is intended to be broadly interpreted to include a channel path display server (e.g., channel path display server 150) or a user of a channel path display server.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    displaying, on a user interface, equipment associated with a channel path of a video network;
    receiving selection of one of the equipment;
    displaying, on the user interface and in response to receiving the selection of the one of the equipment, the selected equipment;
    receiving selection of a port of the selected equipment; and
    displaying, on the user interface and in response to receiving the selection of the port, other equipment of the video network connected to the selected port.

2. The method of claim 1, further comprising:
    determining information related to the equipment associated with a channel path of the video network; and
    displaying the determined information.

3. The method of claim 1, where displaying the equipment comprises:
    displaying interconnections between the equipment of the video network that form the channel path.

4. The method of claim 1, further comprising:
    highlighting a connection between the selected port and the other equipment.

5. The method of claim 4, where highlighting the connection further comprises:
    color coding the highlighted connection between the selected port and the other equipment based on receiving the selection of the port.

6. The method of claim 4, further comprising:
    displaying channel information related to the highlighted connection, where the displayed channel information includes information associated with a channel transmitted, by a network, between the selected port and the other equipment.

7. The method of claim 1, further comprising:
    enabling a user to virtually scroll through the equipment of the video network by selecting ports of the equipment.

8. The method of claim 1, further comprising:
displaying for the selected equipment, at least one of region information, model information associated with the selected equipment, or identification information.

9. The method of claim 1, further comprising:
displaying status information related to the selected equipment and the other equipment;
displaying identification information related to the selected equipment and the other equipment; and
displaying port level details of the selected equipment and the other equipment.

10. A device comprising:
a memory to store a plurality of instructions; and
processing logic to execute instructions in the memory to:
retrieve channel information and equipment information associated with a video network,
store the channel information and the equipment information in the memory,
cause equipment, associated with a channel path of the video network, to be displayed based on the channel information and the equipment information,
receive selection of one of the equipment,
cause the selected equipment to be displayed in response to receiving selection of one of the equipment,
receive selection of a port of the selected equipment, and
cause other equipment of the video network and connected to the selected port, to be displayed in response to receiving the selection of the port.

11. The device of claim 10, where the memory comprises a database that stores the channel information and the equipment information.

12. The device of claim 11, where, when causing the equipment associated with the channel path of the video network, to be displayed, the processing logic further executes instructions in the memory to:
determine the equipment associated with the channel path based on the channel information and the equipment information in the database.

13. The device of claim 10, where the video network comprises a television network.

14. The device of claim 13, where the television network comprises an interconnected super head end (SHE), a video hub office (VHO), and a video service office (VSO).

15. The device of claim 14, where the SHE, the VHO, and the VSO comprise the equipment of the video network.

16. The device of claim 10, where the processing logic further executes instructions in the memory to:
determine information related to the equipment of the video network, and
cause the determined information to be displayed.

17. The device of claim 10, where the processing logic further executes instructions in the memory to:
cause interconnections, between the equipment of the video network that form the channel path, to be displayed.

18. The device of claim 10, where the processing logic further executes instructions in the memory to:
highlight a connection between the selected port and the other equipment.

19. The device of claim 18, where the processing logic further executes instructions in the memory to:
color code the highlighted connection between the selected port and the other equipment.

20. The device of claim 18, where the processing logic further executes instructions in the memory to:
cause channel information, related to the highlighted connection, to be displayed.

21. The device of claim 10, where the processing logic further executes instructions in the memory to:
enable a user to virtually scroll through the equipment of the video network by selecting ports of the equipment.

22. The device of claim 10, where the processing logic further executes instructions in the memory to:
cause, for the selected equipment, at least one of region information, model information, or identification information, to be displayed.

23. The device of claim 10, where the processing logic further executes instructions in the memory to:
cause, status information related to the selected equipment and the other equipment, to be displayed;
cause identification information related to the selected equipment and the other equipment, to be displayed; and
cause port level details of the selected equipment and the other equipment, to be displayed.

24. A system comprising:
means for displaying equipment associated with a channel path of a video network;
means for receiving selection of one of the equipment;
means for displaying the selected equipment in response to receiving the selection of the one of the equipment;
means for receiving selection of a port of the selected equipment; and
means for displaying other equipment of the video network connected to the selected port in response to receiving selection of the port of the selected equipment.

* * * * *